Patented Dec. 6, 1949

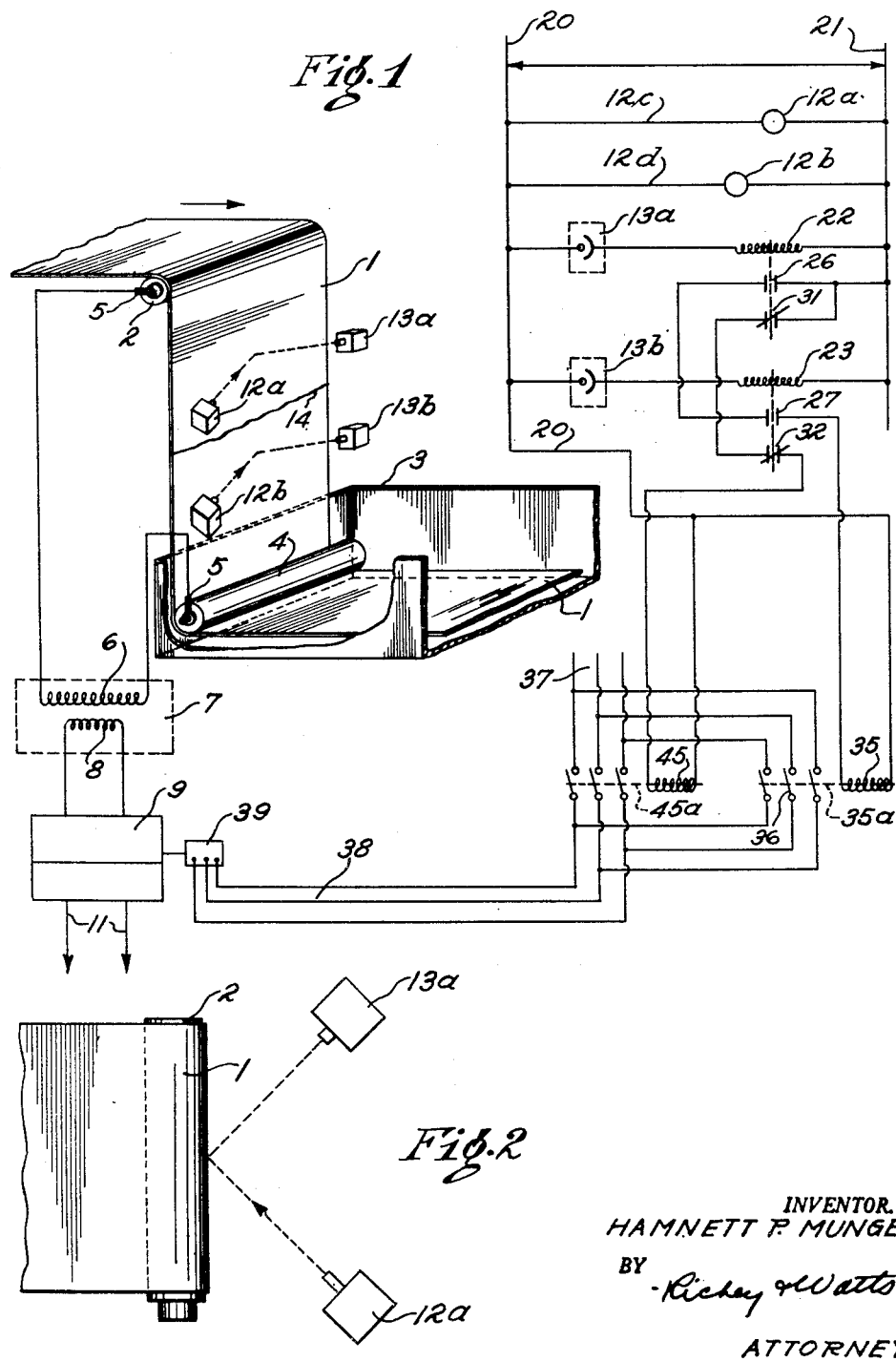

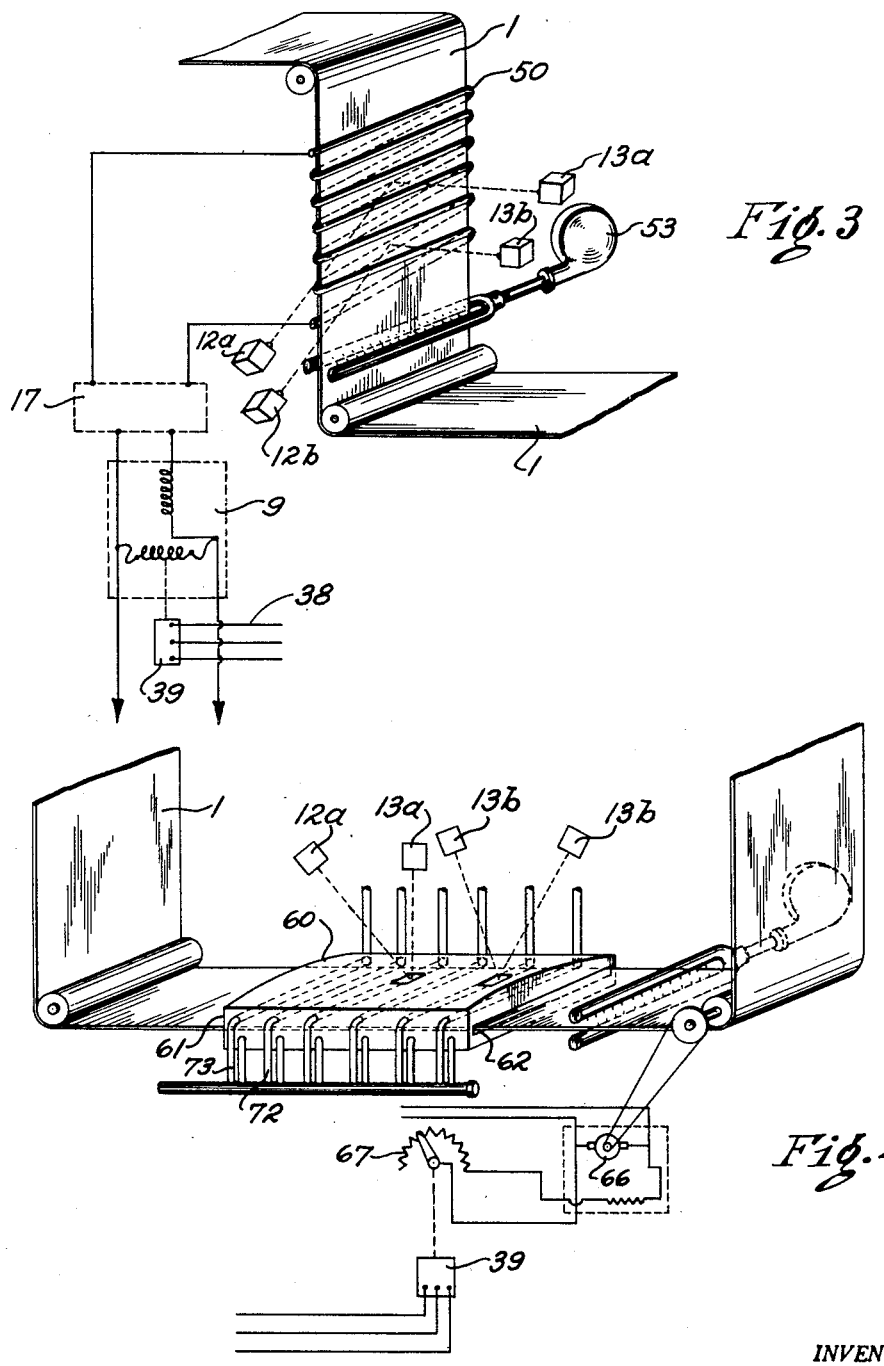

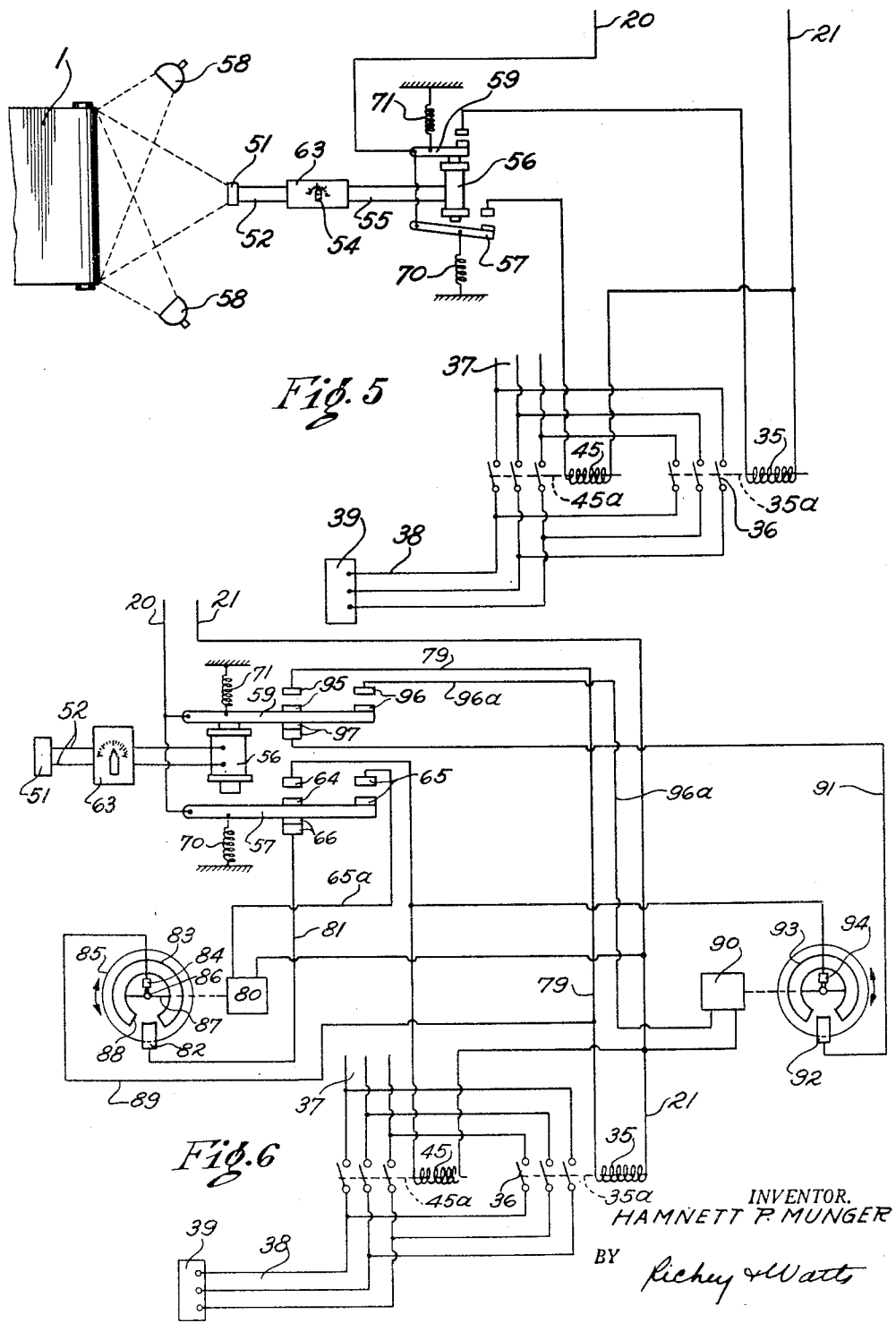

2,490,084

UNITED STATES PATENT OFFICE 2,490,084

METHOD OF CONTROLLING FLOW BRIGHTENING OF PLATED METAL ARTICLES

Hamnett P. Munger, Warren, Ohio, assignor to Republic Steel Corporation, Cleveland, Ohio, a corporation of New Jersey Application January 14, 1943, Serial No. 472,360

12 Claims. (Cl. 204—36)

1

This invention relates generally to the art of heating metal and particularly to a new and improved method of, and new and improved apparatus for, controlling the heating of articles coated with metals which have different physical and light reflecting properties at temperatures below and above their melting points.

I have discovered that certain metals reflect light in one way, or to one extent, at temperatures below their melting points and in another way or to a different extent at temperatures above their melting points. For example, although a coating of (electroplated) tin on a steel body and at a temperature below the melting point of the tin reflects light from a source of light directed angularly onto the coating, this reflected light is considerably diffused after it hits the coating; while at temperatures above the melting point of the coating the reflection is less diffused, the angle of reflection being substantially but not necessarily equal to the angle of incidence. This difference in reflection properties between the unmelted and melted metal may result in a considerable difference in the voltage or current output when the reflected light is used to energize a photo electric cell.

The present invention utilizes the foregoing discovery to control the heating of articles coated with metals which have differential light reflecting properties at temperatures below and above their melting points. By employing that discovery I have been able to control (a) the movement of an article coated with such a metal through a heating device, (b) the place in the heating device where the coating melts, (c) the rate of heat input into the article, (d) the time interval between the melting and quenching of the coating, and (e) the distance between the point of melting and quenching. Furthermore, I am also able to indicate when the coating has attained its melting temperature.

In the drawings accompanying and forming a part of this specification,

Fig. 1 shows diagrammatically one form of apparatus embodying, and useful in carrying out, the present invention and including electrical means for heating a coated article, and an electrical circuit for controlling the rate at which the article is heated by said heating means;

Fig. 2 is a diagrammatic plan view showing the relative placement of certain parts shown in Fig. 1;

Fig. 3 is a view similar to Fig. 1 but showing another form of apparatus in which the article is controllably heated by induction;

Fig. 4 is a view similar to Fig. 1 but showing another form of apparatus in which the rate of travel of the article through a heating furnace is electrically controlled;

Fig. 5 is a diagrammatic view of another form

Figure 7:
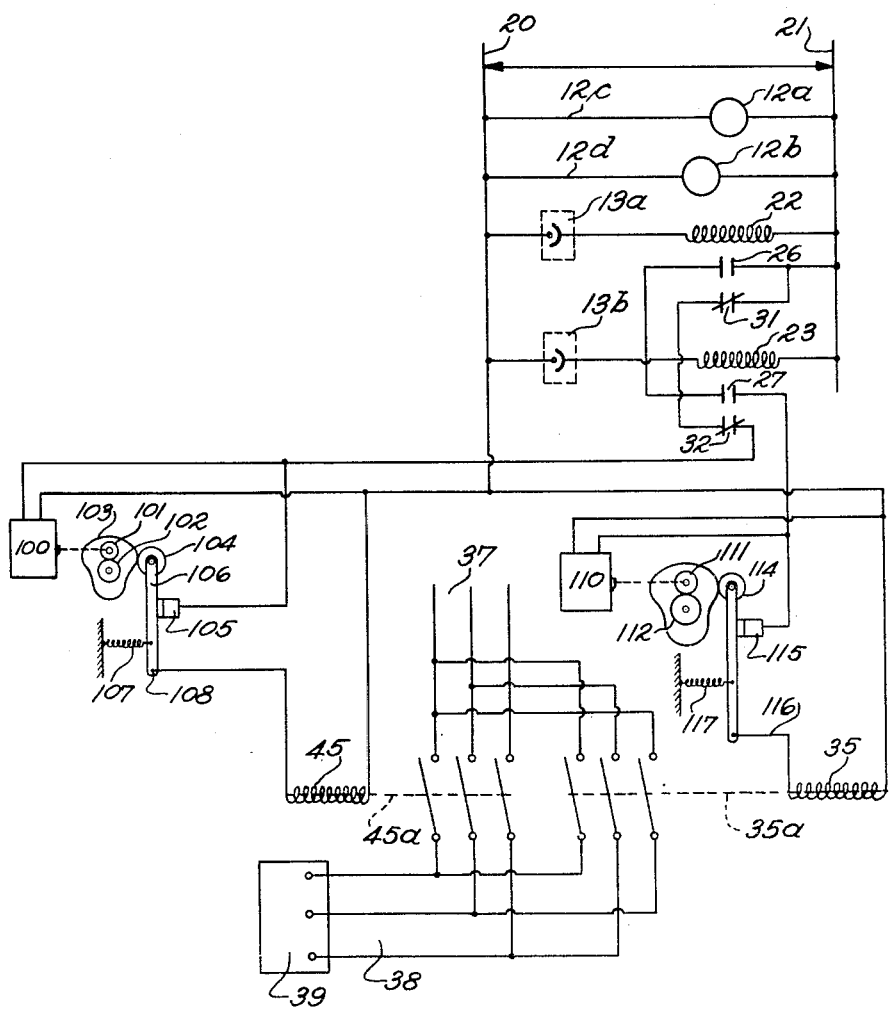

2 of apparatus useful in carrying out the present invention;

Fig. 6 is a diagrammatic view of a modification of the apparatus of Fig. 5; and

Fig. 7 is a diagrammatic view of a modification of Fig. 1.

Referring to the drawings throughout which like parts have been designated by like reference characters;

In Fig. 1 the article 1 is a long steel strip having on the upper surface thereof a coating of tin which was applied thereto by the electroplating process. This strip 1 is shown as passing over an upper roller 2 and down into a quenching tank 3, wherein it passes underneath a roller 4. It will be understood that the strip, after leaving roller 4 may travel for any desired distance in the quenching liquid in tank 3 and then pass vertically or at an angle out of the liquid where it may be subjected to any further and desired operation.

The rollers 2 and 4 are exteriorly composed of electrically conducting material and by means of brushes 5 or other suitable means are electrically connected into the secondary circuit 6 of a transformer 7. The primary 8 of the transformer 7 is connected through an induction regulator 9 to the leads 11 of a source of alternating current. It will be understood that when current flows in leads 11 and through 9 a flow of current will be induced in circuit 6 which is completed by the strip 1 being in contact with the rollers 2 and 4 and that the flow of current through the strip 1 between rollers 2 and 4 and will thereby heat the strip between those rollers.

Light sources 12a and 12b are positioned to direct light at an angle down onto the coating on strip 1 between rollers 2 and 4 at places spaced along the course of travel of the strip between those two rollers. Although only two of these light sources are shown, more than two may be used if desired and, furthermore, they may be positioned differently than here shown. The important thing is to have one or more of these light sources disposed on opposite sides of the place where it is desired that the coating on the article shall attain its melting temperature. It should also be understood that this angle may be 90° if desired.

Photo electric cells 13a and 13b are positioned so as to pick up reflected light from sources 12a and 12b respectively, which is reflected by the coating metal on strip 1, at least one such cell being provided for each light source. Assuming that line 14 indicates the point at which the coating on the strip 1 melts, and therefore that the coating is not melted when it passes light source 12a, the cell 13a will not pass sufficient current to operate a relay because the unmelted coating will not reflect a sufficient amount of light. However, the coating which passes source 12b, which is beyond line 14, will be molten and the cell 13b will be receiving enough reflected light from source 12b to cause it to pass sufficient current to energize a relay.

The photo cells 13a and 13b are electrically connected to control the induction regulator 9 so as to vary the amount of current flowing in circuit 6 and through the strip between rollers 2 and 4 so that the line 14 where melting of the coating takes place can be maintained between source 12a and its cell 13a on the one hand and source 12b and its cell 13b on the other hand. This apparatus is diagrammatically shown in the wiring diagram portion of Fig. 1. The conductors 20 and 21 are connected to a source of current, not shown, which may be direct current, and which furnishes a current supply for the control apparatus about to be described. Each of the light sources 12a and 12b are energized from the lines 20—21 being connected thereto by conductors 12c and 12d respectively.

The photo cells 13a and 13b are each connected across the lines 20—21 in series with relay coils 22 and 23 respectively. The relays represented by the windings 22 and 23 may be of any conventional type, designed to operate when a predetermined amount of current flows through the windings. Each relay has two positions, a de-energized and an energized position and two pairs of contacts adapted to be closed in alternate positions. The contacts 26 and 31 are associated with the relay 22 and the contacts 27 and 32 are associated with the relay 23. The contacts 31 and 32 are arranged to be normally closed contacts when the relays are de-energized while the contacts 26 and 27 are normally open contacts when the relays are de-energized. Contacts 26 and 31 of relay 22 are connected directly to the line 21. The other sides of these contacts are connected to the contacts 27 and 32 respectively, of the relay 23. The other side of the contacts 27 and 32 of relay 23 are connected to the windings 35 and 45 respectively, of a magnetic contactor device, and the other terminals of these windings are connected directly to the line 20.

It will thus be noted that the line is connected to the operating coils 35 and 45 of the reversing magnetic contactor through the pairs of contacts of the relays 22 and 23 which pairs of contacts are in series.

The reversing magnetic contactor mechanism as indicated in the drawings may comprise the two coils 35 and 45 respectively, which may be solenoids and are arranged to operate armatures 35a and 45a respectively. The armatures are connected to the triple pole switches such as 36 for coil 35, which switches control the connections for the motor for driving the induction regulator in a three-phase alternating current power line 37. When the switch controlled by the solenoid 35 is closed the motor 39 is driven in one direction. When the switch controlled by the solenoid 45 is closed the power lines 37 are connected to the motor to drive it in the reverse direction.

In normal operation of the device, light from the source 12a is directed in this instance onto the strip 1 in such a manner that the photo cell 13a will pick up the light reflected therefrom. It being assumed that the device is in operation and that the flow line is intermediate the cells 12a and 12b, as indicated by the line 14 on the drawings; the surface that is unmelted does not have sufficient reflecting properties to cause a very large current to be passed by the photo cell 13a. The amount of current passing through this cell of course increases with the amount of light entering the cell and at this particular place on the strip 1 diffuse reflection occurs and less light is picked up by the cell hence the current is sufficiently low that the relay 22 will not operate. In this position contact 26 of relay 22 is open and contact 31 is closed. Current is directed from line 21 through contact 31 of relay 22 to contact 32 of relay 23.

The light source 12b is also positioned to direct the rays of light at an angle incidence to the strip 1 such that it will be reflected into the photo cell 13b. In normal operation the coating will be molten at this point and since the molten coating does not diffuse the light as much as the non-molten coating the amount of light entering the photo cell 13b will be sufficient to energize relay coil 23. In this case contact 27 will be closed and contact 32 will be opened and since the only live line to the relay 23 is via contact 31 of relay 22 to contact 32 of relay 23 and because contact 32 is open it will be seen that under these conditions neither operating coil 45 nor operating coil 35 of the magnetic contactors operating the motor 39 on induction regulator 9 is energized. The control on the induction regulator is at rest and the power input is constant and sufficient to cause the plated coating on strip 1 to melt, this being a balanced condition controlled by the speed of strip 1, and the flow line (line of melting) between 13a and 13b.

If the current should be insufficient to melt the coating on strip 1 where the light is picked up on the cell 13b, the light from source 12b and reflected to 13b by strip 1 will be diffused and the current generated or passed by the cell 13b will be insufficient to operate the relay 23. In this case, it being assumed that the line of melting should be at point 14 and above cell 13b, and assuming that the metal has not melted at cell 13b, it is, of course, desirable to increase the current through the strip and heat the strip to cause the line of melting to rise above the point at which cell 13b received its reflection from source 12b. Since the light from the source 12b is striking a solid or unmelted surface and the diffused reflection is not sufficient to cause photocell 13b to pass a current large enough to operate the relay 23, the relay will be in its de-energized position where the contact 32 is closed and contact 27 is open. In this state, it will be seen that current is flowing through the line 21 through the closed contact 31 of the relay 26 and through the now closed contact 32 of the relay 23 to the operating coil 45 of the magnetic contactor. This causes the armature 45a to be moved and closes the switch which connects the motor 39 through the lines 38 directly to the three-phase alternating current power line 37. This causes the motor 39 to be energized and actuates the induction regulator to increase the voltage in the primary circuit 8 of the strip heating transformer and thus increase voltage and current in the secondary which is connected to the rollers 2 and 4. The current in the strip 1 thus increases and the heat in the strip is increased until the flow line moves above the photo cell and light source 13b and 12b, respectively. At this point since the surface becomes molten the reflecting properties of the surface cause the photo cell to pick up more light and pass more current through the relay coil 23 operating the relay to close the contact 27 and open the contact 32. The circuit from the lines 20 and 21 to the coil 45 is thus broken and the switch, controlled by the coil 45 and armature 45a, is opened and the induction regulator driving motor is deenergized.

It may be desirable to have the induction regulator returnable to a predetermined position, in order to reduce the current through the strip 1 to prevent an undue heating of the strip and reduce the hunting effect that might take place in the mechanism. In this case, as soon as the switch controlled by the solenoid 45 is open the motor 39 could be returned a predetermined proportionate amount by a suitable spring mechanism to thus reduce the current. The amount of this return could be adjustable and determined by experience in observation of its operation.

Still another method of limiting the possibility of such hunting would be to provide the cell circuits each with timing devices which would be energized by current in the cell circuits and these devices would be effective to open the regulator motor circuit ahead of the time when it would be opened by a change in current in the cell circuits. Thus the temperature connection by increase or decrease in current would be stepwise in order for the time lag inherent in the process of changing the temperature to be overcome, and there would be no tendency to over-regulate. Both of the above mechanisms for preventing hunting are hereinafter more fully described.

Should the current increase so that the flow line rises on the strip from the point 14 until the surface is melted opposite the light source and cell, 12a and 13a, the cell 13a will pass sufficient current (the light being reflected by the molten surface) to operate the relay 22. This will cause the contact 26 to be closed and the contact 27 to be opened. Since the contact 27 of the relay 23 is now closed, (the cell 13b picking up enough light to keep the relay energized) current will flow from the line 21 through the contact 26 and contact 27 to the coil 35 of the magnetic contactor switch which will operate the switch 36 through the armature 35a to close the circuit from the three-phase power line to the motor 39 the connections being made in such a manner (as indicated) that the motor 39 is driven in a reverse direction and the regulator is operated to reduce the voltage in the primary circuit. This necessarily reduces the current in the secondary circuit and since less current is flowing through the strip 1 the flow line of the molten metal recedes to below the light source and cell 12a and 13a at which time the relay 22 again becomes deenergized and the contact 26 is opened de-energizing the circuit to the contactor operator coil 35 opening the switch 36 and preventing a further decrease in the current through the strip 1.

It will thus be seen that the light source and photo cell 12a—13a serves to maintain the flow line below their position and the light source and cell 12b—13b serves to maintain a sufficient current to keep the flow line at the point 14 and above the light source and cell 12b—13b.

The metal is quenched when it enters the tank 3 wherein the fluid is above the roller, this being desirable in order that the molten surface will not be marred when it contacts the roller 4.

As best shown in Fig. 3, I have provided another method of heating the strip 1 which is controlled by the same control mechanism but where the heating is accomplished inductively. In this instance, the terminals of the high frequency current oscillator 17 are connected to an induction coil 50 through which the strip 1 travels.

In this case the light source and cell 12b—13b assures that the coating will be melted before leaving the induction coil and the light source and cell 12a—13a prevents the surface from being melted above a predetermined point. Otherwise the operation is substantially the same as that described for a resistance type of heating. In this modification I have also shown another form of quenching where the tank is replaced by a blower 53 which directs a blast of cold gas (air, deoxidizing gas, etc.) through jets against the surface of the strip for cooling the same. A combination of gas and liquid quench may also be used if desired.

Obviously, in this instance it may be desirable to make certain changes in the power supply and regulator furnishing current to the induction coil which will generate the heat required in the strip to melt the coating.

In Fig. 4 I have shown another form of apparatus wherein the heating of the surface is accomplished by passing the strip through or in proximity to a furnace or other device of similar character, to melt the coating on the strip. In this instance the furnace is shown at 60 with the strip entering in one side at 61 and coming out of the other end at 62. The temperature of the furnace in this instance may be maintained constant and the heating may be provided by radiant tube heaters 72, 73 or other convenient means. In this instance the light sources and cells 12a—13a and 12b—13b are placed in positions which will restrict the zone of the flow line between them, and in any desired area, usually near the exit end of the furnace. The drive for the strip in this instance is controlled by a motor 66 the speed of which may be varied by a controller 67. The controller 67 is operated by the reversible motor 39 to increase or decrease the speed of movement of the strip through the furnace in the same manner that the heating effect was increased and decreased in the previous embodiments.

Although I have shown the placement of the photo cells as being at an angle of reflection substantially equal to the angle of incidence it should be understood that this is not strictly essential, particularly in Fig. 1. For instance, I contemplate flooding the sheet with light and allowing the cells to merely look at the lighted sheet. The difference in light absorption between the melted and unmelted surfaces will be sufficient to cause difference in the voltage and output from the cells. In some instances where there is sufficient light at the place where the process is being carried on it may be advisable to use the cells alone and no extra light would be needed. Obviously, in this last case, it would be advisable to use a more sensitive cell. In any of the various constructions, the process of having the cells view the sheet of metal may be considered as a scanning process and the differential in current output from scanning the sheet at points where the surface material is melted or unmelted may be used to control the heating of the strip.

In Fig. 5 I have shown another modified form of my invention wherein the strip 1 is flooded with light from lights 58 to provide a substantially even illumination for the surface. Disposed opposite to the sheet and spaced therefrom is a photo-cell 51 which is adapted to view the surface of the sheet which may include all of the zone where the melting occurs and preferably a portion of the space on either side of the zone where the surface is unmelted. It is possible to view the sheet in such a manner that equal parts of the melted and unmelted zones are included. This cell views the sheet in much the same manner as a photo-electric exposure meter views a scene which is to be photographed. It will therefore be seen that the current in the cell will be dependent upon the condition of the reflecting surface, and that the cell will pick up more or less light depending upon the size of the melted area. The output of the cell is connected by leads 52 to an amplifier 53, the gain of which may be controlled in any well known manner, the control knob being indicated at 54.

It will thus be seen that with the cell viewing the sheet in this manner the current output from the amplifier will vary between certain limits and that the gain can be controlled to cause boundaries of the gain to be shifted between certain desired values. This gain will also vary between these boundaries depending upon the light pickup of the cell and this varying current can be used in various manners to control the operation of the heating unit whether it be resistance as in Fig. 1 or the apparatus as illustrated in Figs. 3 and 4.

One form of such control is illustrated in Fig. 5 wherein the output from the amplifier is fed through the lines 55 to a relay coil 56. This relay is shown diagrammatically and may be made in various manners. The device shown contemplates a pair of armatures 57 and 59. The armature 57 is arranged to close when the current in the circuit exceeds a certain predetermined value and the armature 59 is arranged to close when the current decreases below a certain predetermined value. In this manner it will be seen that when the current in the amplifier is between certain limits both sets of contacts will be open because the current is sufficient to maintain the armature 59 with its contacts open and still insufficient to cause the armature 57 to close the contact. Assuming that the cell 51 in this instance operates to generate a greater current when it views the surface of the sheet 1 whereon the melted area is decreasing and the unmelted area is increasing; this being because with a device of this character, where the sheet is flooded with light the cell may operate to generate the greatest current when the light reflected is non-specular due to the diffusion from the unmelted surface whereas when the surface becomes melted the angles of the light sources are such that less light is reflected onto the cell because the angle of incidence and the angle of reflection is unequal. When the surface is melted only specular light will be picked up by the cell. Obviously, the device can be made to operate either way. That is, it can be made to operate in such a manner that only specular light falls upon the cell and the light is directed away from the cell when the surface is unmelted due to the diffusion properties of its surface.

However, assuming that the cell picks up greater light when the area of the surface which is melted becomes smaller, the current in the amplifier will increase and more current will flow through the relay coil causing the armature 57 to close its contacts connected to line 20 directly to the coil 45 to actuate the switch armature 45a in substantially the same manner as that described for Fig. 1. This operates the controller motor 39 and increases the current in the system.

As soon as the melted area becomes larger the current in the relay decreases due to less pickup of light and the armature 57 is opened by the spring 70 stopping the controller 39. Should the melted area increase larger than that desired, then the light in the cell will decrease to such an extent that the relay 56 will have insufficient current through the coil to hold the armature 59 and its contacts open in which event the spring 71 will move the armature 59 to close the contacts energizing the coil 35 and switch 36 to reverse the induction controller 39 in the manner previously described for Fig. 1.

It may be found that the lights 58 are unnecessary and that there is sufficient light at the point where the operation is carried out to afford the desired pickup by the cell 51.

It may also be found that under certain circumstances the effect of the reflection of the light will be exactly the opposite to that described and wherein when the melted surface attains the greatest area the greater current will flow, and that when the unmelted area attains the greatest area the least current will flow. In this event, it is only necessary to reverse the leads from the solenoids 45 and 35 to the armatures 57 and 59 and the operation will continue in substantially the same manner as described.

As best shown in Fig. 6 I have shown a modification of the apparatus of Fig. 5 wherein the hunting or overcontrol which may be due in part to the time lag for a change in the heating or cooling of the strip may be eliminated.

Generally it contemplates reversing the movement of the motor 39 after each operation thereof caused by the system's calling for more or less heat. That is, if the motor 39 is energized to increase the heat, and the heat in the strip increases until the photocell recognizes the change or increase and opens the motor circuit, then immediately the motor 39 is again operated but in the reverse direction to cause a change of the control in the opposite direction, thus preventing the heat from going so high as to overheat the strip and make it necessary for the other photocell to reverse the motor to cut down the heat. Although the mechanism as shown and described is connected with an apparatus such as Fig. 5 it is obviously adaptable to each of the other embodiments.

In carrying out the invention the relay armatures 57 and 59 are each provided with two additional contacts. Should the heat be insufficient to maintain equilibrium and the melted area becomes smaller than that desired, the additional light picked up by the cell 51 will cause the armature 57 to be attracted to the coil 56 and close the contacts 64 which connects the line 20 to the contactor winding 45. This causes the motor 39 to be operated to increase the power output, as previously described.

Simultaneously with the closing of contacts 64, however, the contacts 65 will also close and the contacts 66 on the opposite side of the arm will open.

Contacts 65 connect the line 20 by line 65a to a motorized switch indicated diagrammatically at 80. The circuit is completed through the other wire to the hot line 21. This switch is of a well known design and includes a small fractional horsepower motor connected by a gear train to a rotor or contactor. The motor and contactor can be rotated or "wound up" in substantially one revolution of the contactor after which the contactor meets an adjustable obstruction which causes it to stop and the motor to be stalled. The contactor, during the "winding up" operation, is rotated against the tension of a spring which continuously exerts a force tending to "unwind" or rotate the contactor in the opposite direction against the force of the motor. When the motor is de-energized the spring "unwinds" the device rotating the contactor back to its original position.

The rotor, which is illustrated diagrammatically in the figure, includes a body 85 of insulation material supported on a shaft 86. A brush 84 connects a lead 89 to the shaft and the shaft in turn is connected by leads 87 to a flat contact ring 83. The ring is broken at 88, the ends being spaced apart a predetermined distance, this distance being sufficient that a brush 82 may be disposed between the ends of the ring out of contact with the contactor in the starting position. The rotor is rotated from the position shown, and the brush 82 rides on the face of the contactor ring 83 and makes contact therewith. The brush 82 is connected by the lead 81 to the contact 66 and the brush 84 is connected by the lead 89 to the line 79, which is the open circuit line leading to the contactor winding 35, the contactor winding 35 being operable upon energization to reverse the motor 39 as previously described. The other lead 21 to the winding 35 is continuously energized.

When the winding 45 is de-energized due to the reduction in current in the coil 56 when the heat has been increased, the armature 57 will be retracted, to the position shown, by the spring 70. At this time the armature 57 will close the contacts 66 and the spring will unwind the motor 80 causing the ring 83 on the rotor 85 to travel under the brush 82 completing the circuit from the line 21 via the armature 57, line 81, brush 82, ring 83 and lead 89 to the lead 79 of the contactor coil 35. The contactor coil is thus energized closing the switch 36 and reversing the motor 39. The motor 39 will operate for the time it takes to rotate the rotor 85 back to its starting position, at which time the brush 82 rides off the ring 83 opening the circuit. This short energization of the motor 39 causes a reduction in the current which has just previously been increased.

As previously stated the rotor 85 may be provided with an adjustable stop not shown, by means of which the stalled position can be determined and hence the amount of time that the motor 39 is energized in the reverse direction can be adjusted. Thus the heat can automatically be reduced a predetermined amount to overcome any undesirable effect such as an undue increase in heat due to time lag of the heating.

A similar arrangement is used to increase the heat should the operation of reducing the heat be carried too far. In this case the armature 59 is provided with contacts 95, 96 and 97. Contact 95 is connected by line 79 to the winding 35. Contact 96 is connected by the line 96a to the motorized switch 90 and contact 97 is connected by the line 91 to the stationary brush 92 which corresponds to the brush 82 of the other device just described. The operation is substantially the same, that is, when the heated area of the metal becomes too large the current in the relay coil decreases until the armature 59 is moved by the spring 58 to close the contacts 95 and 96.

The circuit to the winding 35 is thus closed and the motor 39 energized to reduce the heating current. Simultaneously the contact 96 is closed causing the motorized switch 90 to be energized, the contact 97 being open at this time. When the heat drops and the relay 56 again receives enough energy to attract the armature 59, the winding 35 is de-energized, at this time the motorized switch circuit is also opened, and the motor 39 is operated to advance the heat, by the ring 93 making contact with the brush 92 and furnishing current to the contactor winding 45 during the unwinding of the switch. This causes the regulator to be advanced a slight amount increasing the current through strip 1.

In Fig. 7 I have shown another modification of my invention for eliminating over-control due to time lag of the heating applied to the apparatus of Fig. 1. It is also applicable to the other apparatus and operates to prevent the over or under-heating by causing the regulator to operate in steps. That is, when more heat is required the motor 39 will be energized to move the regulator 9 but the operation of the motor will not be continuous. It will advance the regulator a predetermined amount, open the circuit to give the heat a chance to build up, then again advance the regulator still farther. The cycle continues until the photocell 13b operates to cause the circuit to be opened.

This is accomplished as shown in the drawings by interposing motor driven circuit breakers in the lines to the windings 45 and 35. In this case, when the circuit calls for more heat the motor 100, which is connected in parallel with the coil 45, is energized. This motor drives a gear 101 which is in mesh with a gear 102 that is rigidly connected to the cam 103. A roller 104 carried by a contact lever 106 pivoted to a fixed support at 108 is held in contact with the periphery of the cam by a spring 107. When the cam rotates the roller follows the cam surface. When it rides on the high part of the cam the switch contacts 105 are closed, and the circuit to the winding 45 is completed and the motor 39 is operated. When the roller reaches the low spot on the cam the contacts 105 are open and the winding 45 is de-energized. In this manner when there is a demand for more heat the motor 100 starts the cam 103 to rotating the motor 39 will be energized to increase the current in the regulator; then for a space the contacts 105 open, the speed of the motor 100 and the cam being regulated so that the length of time that the contacts 105 are open is great enough for the heat to rise to a constant value in the strip. Obviously the motor 100 can be adjusted so that the regulator can be advanced in increments as great as desired.

When a decrease in temperature is desired a similar arrangement decreases the heat in steps. In this case the motor 110 is energized to drive the cam 112, which operates the roller 114 to open and close the contacts 115. The contacts 115 are disposed in the circuit to the contactor winding 35, and the heat is thus decreased in steps.

It will be obvious that many various deviations from the structure of the devices will be apparent, to those versed in the art, from the description herein contained without departing from the spirit of the invention.

Although I have shown a certain particular type relay it should be understood that various types of relays may be substituted other than that shown and in some instances it may be desirable because of a different function in the operation. Furthermore, a suitable interrupting means may be interposed in this circuit to cause either one of the sets of contacts to open anticipatory of the change in the current in the amplifier to minimize the possibility of a hunting effect should it be found necessary or desirable.

Having thus described my invention I am aware that numerous and extensive departures may be made therefrom, without departing from the spirit of the invention.

I claim:

1. Apparatus for controllably heat-treating an elongated member which is continuously moving in the direction of its length in a fluid medium, said elongated member comprising a base-member of a relatively high-melting-point metal having a thin plating of a relatively low-melting point metal, said apparatus comprising the combination, with the means for moving said elongated member, of inductive heating-means adapted to subject a portion of said elongated member to a high-frequency field, while said elongated member is moving in said fluid medium, whereby the field-alterations introduce a large amount of heat sufficient to heat the elongated member to heat-treatment temperatures which is slightly above the melting point of the plated metal, said inductive heating means including a heating coil having a plurality of spaced convolutions, means disposed outside of said coil for directing a beam of light through a space between convolutions and against the elongated member at a predetermined place within the confines of the region where the temperature of the elongated member is being increased, and spaced from but near the end of said region, and a reflected-light-responsive scanning-means disposed outside of said coil for so controlling the relation between the rate of heat-input in the heating portion and the speed of the elongated member as to keep the flow-line of the just-melted plating substantially at said predetermined place, said scanning-means being adapted to be responsive to the difference in the reflectivity of the plating before and after melting.

2. Apparatus for controllably heat-treating a long thin flat strip which is continuously moving in the direction of its length in a fluid medium, said strip comprising a base-member of a magnetizable metal having a thin plating of a plated metal having a relatively low melting-point at a temperature at which the base-member is still quite magnetizable, said apparatus comprising the combination, with the means for moving said strip, of induction coil means adapted to be threaded by said strip whereby said strip is subjected to an alternating field, high-power high-frequency alternating-current generator-means for energizing said induction-coil means within a frequency-range suitable for heating said strip, by alternating currents induced by the field-alternations in said strip, to a temperature only very slightly higher than the melting-point of the plated metal, said coil having a plurality of spaced convolutions, means disposed outside of said coil for directing a beam of light through a space between convolutions and against the strip at a predetermined place within the confines of the induction-coil means, and spaced from but near the end of said induction-coil means, and a reflected-light-responsive scanning-means disposed outside of said coil for so controlling the relation between the rate of heat-input in the heating portion and the speed of the strip as to keep the flow-line of the just-melted plating substantially at said predetermined place, said scanning-means being adapted to be responsive to the difference in the reflectivity of the plating before and after melting.

3. Apparatus for flow brightening electrodeposited tin on tinplate which comprises means for moving such tinplate endwise, means for heating the tin on a portion of the moving tinplate to the melting temperature of tin, means disposed to direct light onto the strip at a predetermined place near the end of said portion of the tinplate, scanning means disposed to receive light reflected by the tinplate, said scanning means being responsive to the difference in said light which is reflected by the melted and unmelted tin on the tinplate, and means actuated by said scanning means for controlling the rate of heat input in direct relation to the speed of travel of the tinplate so as to keep the flow line of molten tin substantially at said predetermined place, said actuated means including a reversible, current controlling motor.

4. Apparatus for controllably melting a metal coating on a higher melting temperature metal article which coating metal has different light reflectivities in the unmelted and molten states, said apparatus comprising means for moving such article endwise, means for heating to its melting temperature the coating metal on a portion of the moving article, a light source disposed to direct light onto the article at a predetermined place near the end of said portion of the article, scanning means disposed to receive light from said source reflected by the coating metal, said scanning means being responsive to the differences in said light which is reflected by the melted and unmelted coating metal on the article, and means actuated by said scanning means for controlling the rate of heat input in direct relation to the speed of travel of the article so as to keep the flow line of molten metal substantially at said predetermined place, said actuated means including a reversible, current controlling motor.

5. Apparatus for flow brightening electrodeposited tin on tinplate which comprises means for moving such tinplate endwise, means for heating the tin on a portion of the moving tinplate to the melting temperature of tin, light source means disposed to direct light onto the strip at two predetermined spaced apart places near the end of said portion of the tinplate, spaced scanning means disposed respectively to receive light from said sources reflected by the tinplate, each of said scanning means being responsive to the differences in said light which is reflected by the melted and unmelted tin on the tinplate, and means actuated by said scanning means for controlling the rate of heat input in direct relation to the speed of travel of the tinplate so as to keep the flow line of molten tin substantially at said predetermined place, said actuated means including a reversible, current controlling motor.

6. Apparatus for flow brightening electrodeposited tin on tinplate which comprises means for moving such tinplate endwise, electrical means including a heating coil extending around a portion of the tinplate for inductively heating the tin on said portion to its melting temperature, means disposed outside of the coil for directing light between convolutions of said coil against the tinplate at a predetermined place within the coil but near the exit end thereof, scanning means disposed outside of said coil to receive light reflected by the tinplate between convolutions of said coil, said scanning means being responsive to differences in the light which is reflected by the unmelted and by the melted tin on the tinplate, and means controlled by said scanning means for controlling the rate of heat input in direct relation to the speed of travel of the tinplate so as to maintain the flow line of the melted tin substantially at said predetermined place.

7. Apparatus for flow brightening electrodeposited tin on tinplate comprising means for moving such tinplate endwise, means for heating the tin on a portion of the moving tinplate to melting temperature, said means including an electrical conductor coiled around a portion of the tinplate in inductive relation thereto, separate light sources disposed to direct light onto the tinplate at spaced places where tin coating is to be in unmelted condition, and where it is to be in molten condition, scanning means disposed to receive, respectively, light from said sources which is reflected by said tinplate, each of said scanning means being responsive to differences in light reflected by the melted and unmelted tin of the tinplate, and means actuated by the scanning means which cooperates with the said first light source to vary the rate of heat input in direct relation to the speed of travel of the tinplate to maintain unmelted tin where light from the first said source strikes the tinplate, and means actuated by the scanning means which cooperates with the second light source to varying the rate of heat input in direct relation to the speed of travel of the tinplate so as to maintain molten tin where the light from the second said source strikes the tinplate, said actuated means comprising a reversible, current controlling motor.

8. The method of controllably melting a metal coating on an article which comprises the steps of heating to melting temperature a coating of metal having different light reflectivities in the unmelted and molten states, reflecting light from said coating, picking up said reflected light by means responsive to variations in the reflectivity of the metal in unmelted and molten states, converting such picked up light into electric currents and actuating reversible, current controlling means by such current to control the melting of said metal.

9. The method of controllably melting a coating of metal having different reflectivities in the unmolten and molten states on a higher melting temperature metal article which comprises the steps of moving said article endwise and progressively heating to melting temperature such a coating of metal, directing separate adjacent light beams onto the coating where it is to be unmelted and where it is to be molten, picking up light from said beams reflected by the unmelted and molten metal by separate means responsive to variations in the reflectivity of the metal in unmelted and molten states, converting such picked up light into electric currents and actuating reversible, current controlling means by such current to control the melting of said metal.

10. The method of flow brightening electrodeposited tin on tinplate which comprises the steps of moving the tinplate endwise, heating the tin on a portion of the moving tinplate to its melting temperature, directing light onto said portion of the tinplate being heated, picking up light reflected by said tinplate by means sensitive to differences in the light reflected by melted and by unmelted tin, converting such picked up light into electric currents having values which are functions of the light reflecting properties of melted and unmelted tin, and actuating reversible, current controlling means by such currents to control the rate of heat input in direct relation to the speed of travel of the tinplate and thereby to maintain the flow line of molten tin substantially at a predetermined place.

11. The method of flow brightening electrodeposited tin on tinplate which comprises moving the tinplate endwise, inductively heating the tin on a portion of the moving tinplate to its melting temperature, directing light onto said portion of the tinplate at two places spaced apart along the line of travel of the tinplate, picking up light reflected from said spaced places by said tinplate by means sensitive to differences in the light reflected by melted and by unmelted tin, converting such picked up light into electric currents having values which are functions of the light reflecting properties of melted and unmelted tin, and actuating reversible, current controlling means by such electric currents to control the rate of heat input in direct relation to the speed of travel of the tinplate and thereby to maintain the flow line of molten tin substantially at a predetermined place between said spaced places.

12. The method of flow brightening electrodeposited tin on tinplate which comprises moving the tinplate endwise, inductively heating the tin on a portion of the moving tinplate to its melting temperature, directing a first light beam onto said portion of the tinplate where the tin is to be unmelted, directing a second light beam onto said portion where the tin is to be molten, picking up light reflected from said beams by said tinplate by separate means sensitive to differences in the light reflected by melted and by unmelted tin, converting such picked up light into electric currents having values which are functions of the reflecting properties of melted and unmelted tin, utilizing the difference in current which occurs when the first said light beam is reflected by molten tin to actuate reversible, current controlling means to decrease the rate of heating of the tin and utilizing the difference in current which occurs when the second said light beam is reflected by unmelted tin to actuate reversible, current controlling means to increase the rate of heating of the tin.

HAMNETT P. MUNGER.

REFERENCES CITED

The following references are of record in the file of this patent:

UNITED STATES PATENTS

| Number | Name | Date |
|---|---|---|
| 1,165,037 | Tarbox | Dec. 21, 1915 |
| 1,377,574 | Frary | May 10, 1921 |
| 1,876,745 | Potter | Sept. 13, 1932 |
| 1,937,420 | Wood et al. | Nov. 28, 1933 |
| 2,085,543 | Oplinger | June 29, 1937 |
| 2,089,014 | Bucknam et al. | Aug. 3, 1937 |
| 2,089,015 | Bucknam et al. | Aug. 3, 1937 |
| 2,089,029 | Jones | Aug. 3, 1937 |
| 2,128,406 | Faust | Aug. 30, 1938 |
| 2,162,692 | Baily | June 20, 1939 |
| 2,205,512 | Anderson | June 25, 1940 |
| 2,312,310 | Bradner | Mar. 2, 1943 |
| 2,329,188 | Denneen et al. | Sept. 14, 1943 |
| 2,357,126 | Nachtman | Aug. 29, 1944 |

FOREIGN PATENTS

| Number | Country | Date |
|---|---|---|
| 107,282 | Austria | Sept. 26, 1927 |